(12) United States Patent
Yamaguchi et al.

(10) Patent No.: US 10,087,853 B2
(45) Date of Patent: Oct. 2, 2018

(54) CONTROL APPARATUS FOR NATURALLY ASPIRATED GASOLINE ENGINE

(71) Applicant: Toyota Jidosha Kabushiki Kaisha, Toyota-shi, Aichi-ken (JP)

(72) Inventors: Yuji Yamaguchi, Susono (JP); Hirokazu Ito, Susono (JP); Yuji Miyoshi, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 17 days.

(21) Appl. No.: 15/591,839

(22) Filed: May 10, 2017

(65) Prior Publication Data
US 2017/0335777 A1 Nov. 23, 2017

(30) Foreign Application Priority Data
May 20, 2016 (JP) ................. 2016-101640

(51) Int. Cl.
*F01N 3/00* (2006.01)
*F02D 9/02* (2006.01)
(Continued)

(52) U.S. Cl.
CPC ........... *F02D 9/02* (2013.01); *F02D 41/0002* (2013.01); *F02D 41/005* (2013.01); *F02D 41/0077* (2013.01); *F02D 41/024* (2013.01); *F02D 41/26* (2013.01); *F02D 41/0255* (2013.01); *F02D 2009/0272* (2013.01); *F02D 2041/0017* (2013.01); *F02D 2200/1002* (2013.01); *Y02T 10/26* (2013.01); *Y02T 10/42* (2013.01); *Y02T 10/47* (2013.01)

(58) Field of Classification Search
CPC ............. Y02T 10/42; F02D 2041/0017; F02D 2009/0272; Y02A 50/2324
See application file for complete search history.

(56) References Cited

U.S. PATENT DOCUMENTS 5,203,311 A * 4/1993 Hitomi ................... F02D 21/08
123/559.1
5,329,912 A * 7/1994 Matsumoto ........... F02B 31/085
123/308

(Continued)

FOREIGN PATENT DOCUMENTS

JP 2015-175357 A 10/2015

*Primary Examiner* — Mark Laurenzi
*Assistant Examiner* — Anthony Ayala Delgado
(74) *Attorney, Agent, or Firm* — Dinsmore & Shohl LLP

(57) ABSTRACT

An object is to supply fresh air and EGR gas into a cylinder in good balance according to the required load in a naturally aspirated gasoline engine. When the operation state of the engine falls in a low load range, a control apparatus adjusts the degree of opening of the second throttle while keeping the first throttle fully open and controls EGR gas quantity by adjusting the degree of opening of the EGR valve. When the operation state falls in a middle load range, the apparatus controls EGR gas quantity by adjusting the degree of opening of the first throttle while keeping the EGR valve fully open. When the operation state falls in a high load range, the apparatus adjusts the degree of opening of the first throttle while keeping the second throttle fully open and controls EGR gas quantity by adjusting the degree of opening of the EGR valve.

2 Claims, 5 Drawing Sheets

(51) Int. Cl.
    *F02D 41/00*     (2006.01)
    *F02D 41/02*     (2006.01)
    *F02D 41/26*     (2006.01)

(56) References Cited

U.S. PATENT DOCUMENTS

| | | | |
|---|---|---|---|
| 2004/0093866 A1* | 5/2004 | Ishikawa | F02M 26/07 60/605.2 |
| 2007/0214771 A1* | 9/2007 | Freitag | F02B 47/08 60/278 |
| 2009/0194079 A1* | 8/2009 | Nagae | F01N 3/0235 123/568.11 |
| 2009/0223221 A1* | 9/2009 | Onishi | F02D 41/0065 60/603 |
| 2010/0031939 A1* | 2/2010 | Ono | F02D 41/005 123/568.22 |
| 2010/0168143 A1* | 7/2010 | Foote | C07D 401/14 514/266.22 |
| 2011/0132336 A1* | 6/2011 | Pursifull | F02D 21/08 123/568.11 |
| 2011/0168143 A1* | 7/2011 | VanDerWege | F02D 41/0007 123/568.15 |
| 2015/0013651 A1* | 1/2015 | Hayman | F02M 26/21 123/568.11 |
| 2017/0082039 A1 | 3/2017 | Sugimoto | |

* cited by examiner

[Fig. 1]
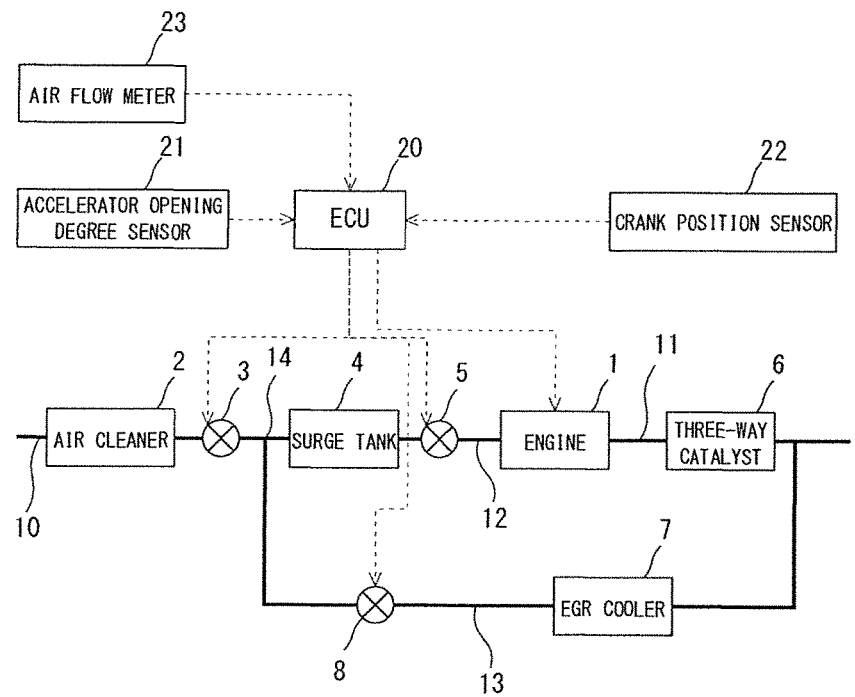
[Fig. 2]
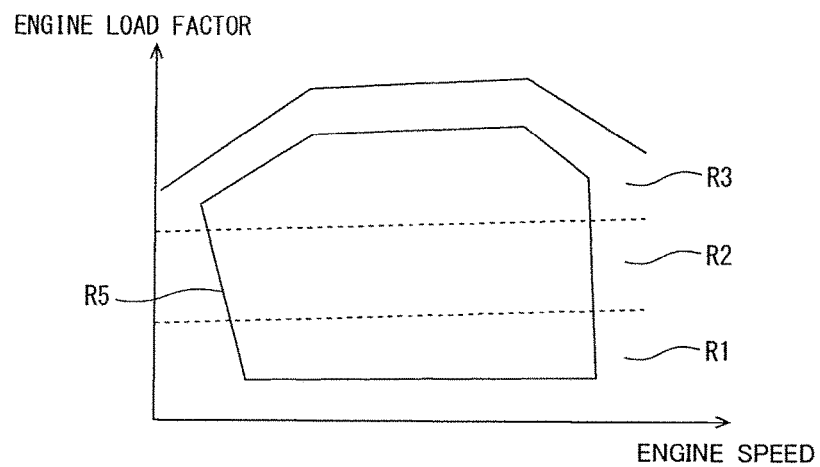

[Fig. 3]
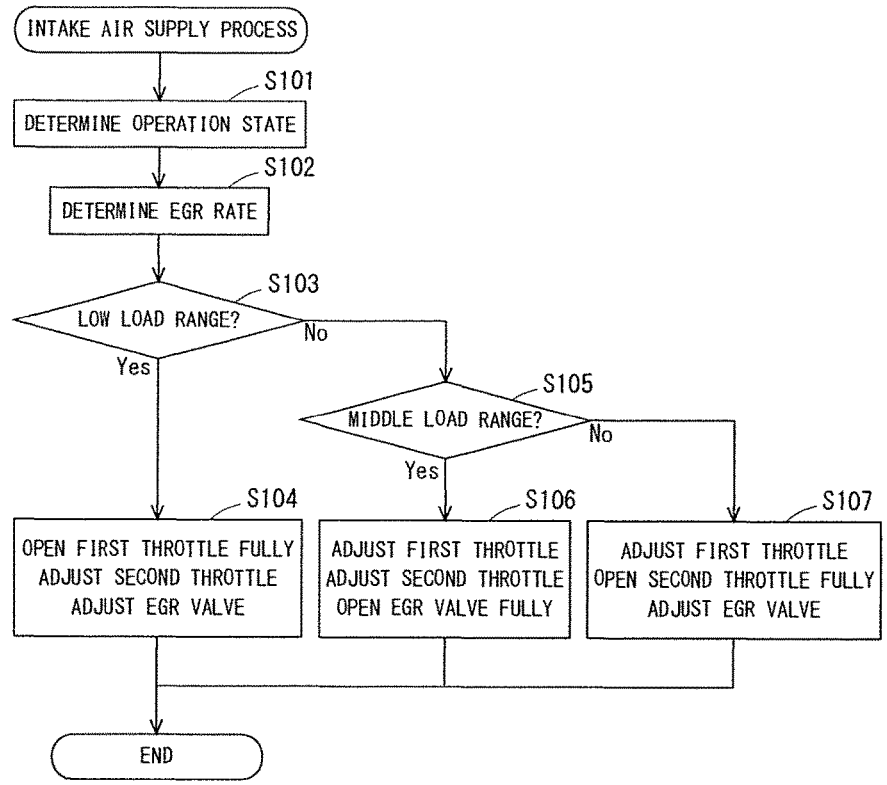
[Fig. 4]
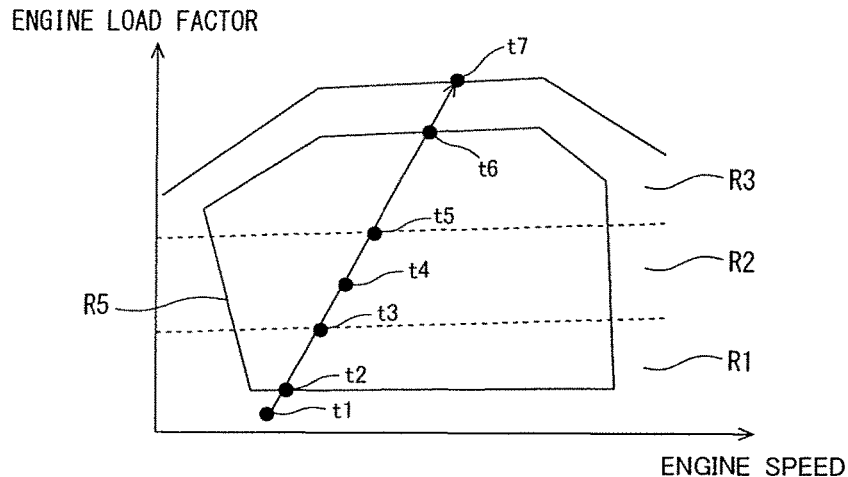

[Fig. 5]
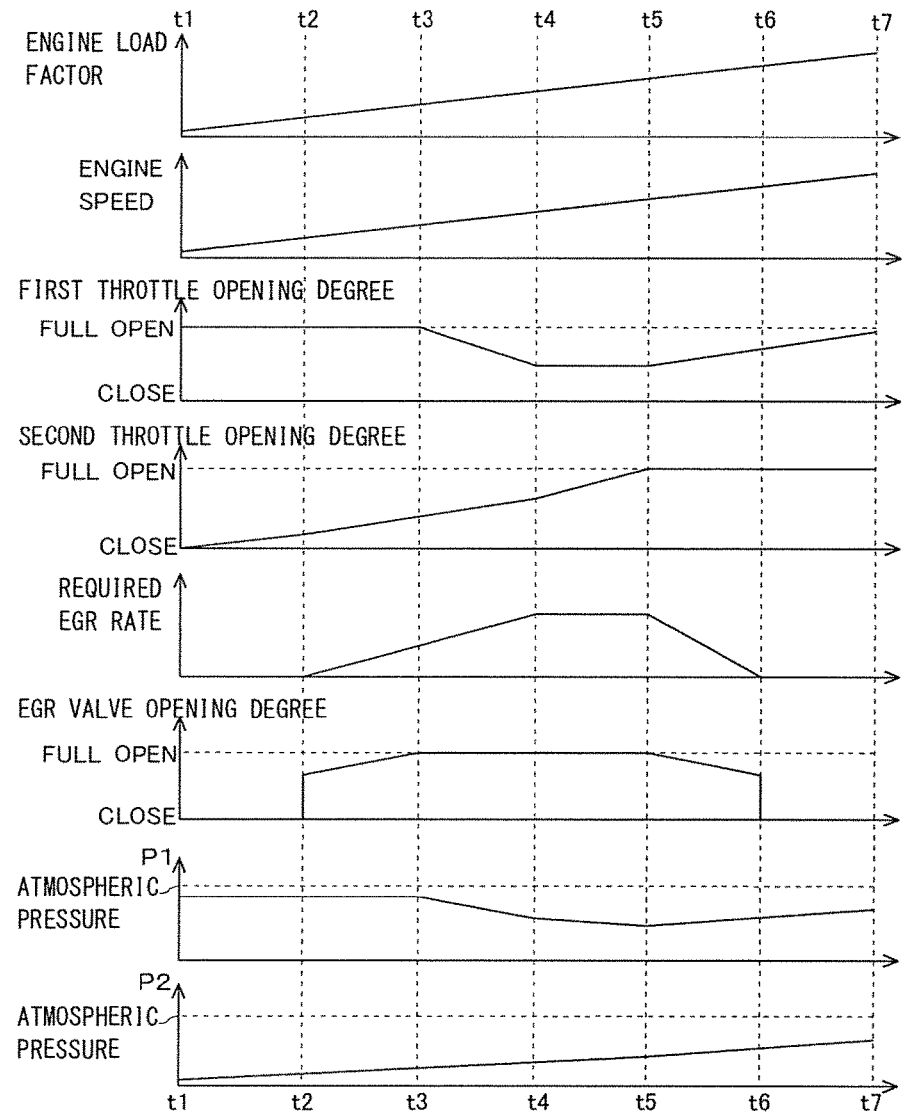

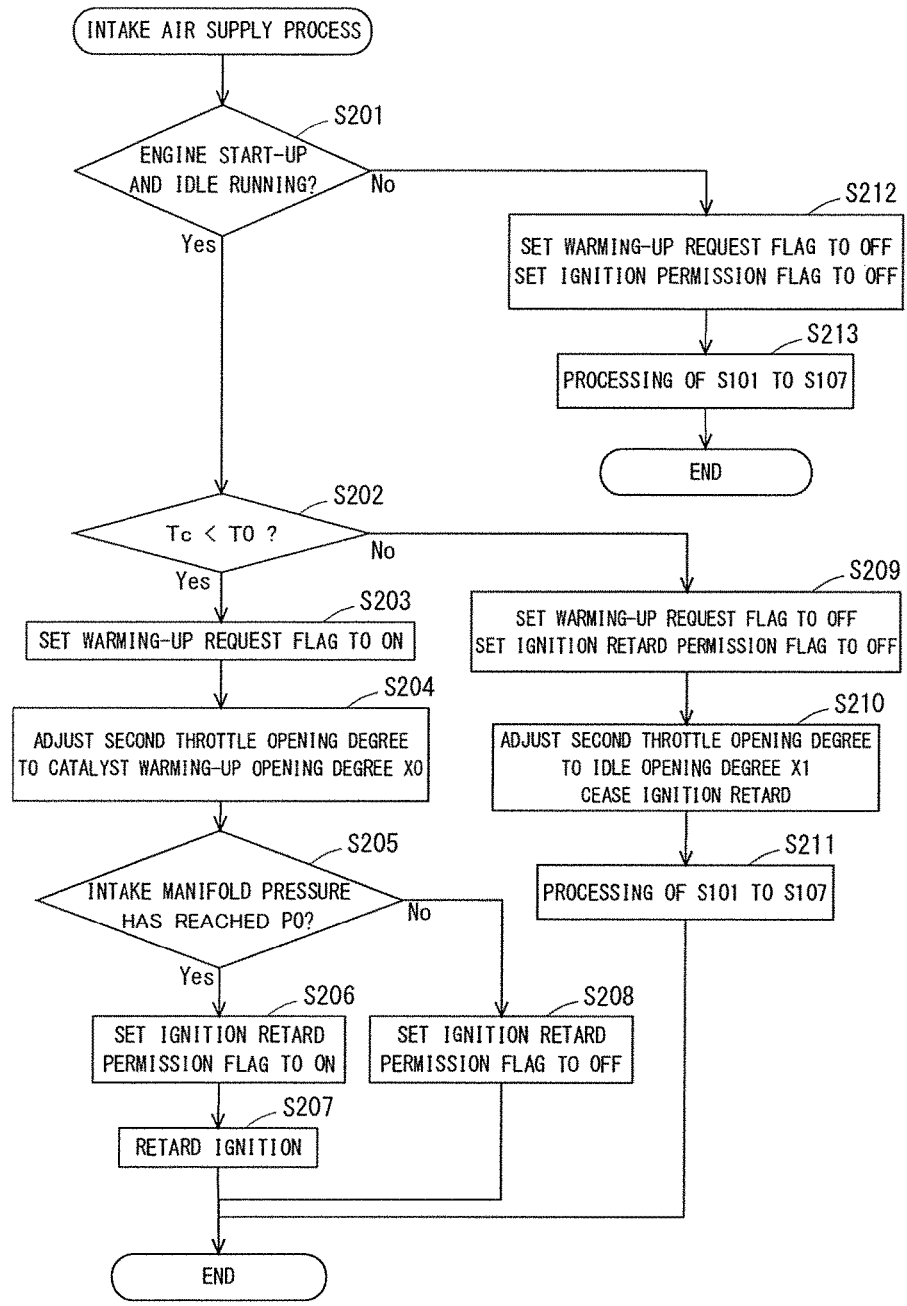
[Fig. 6]

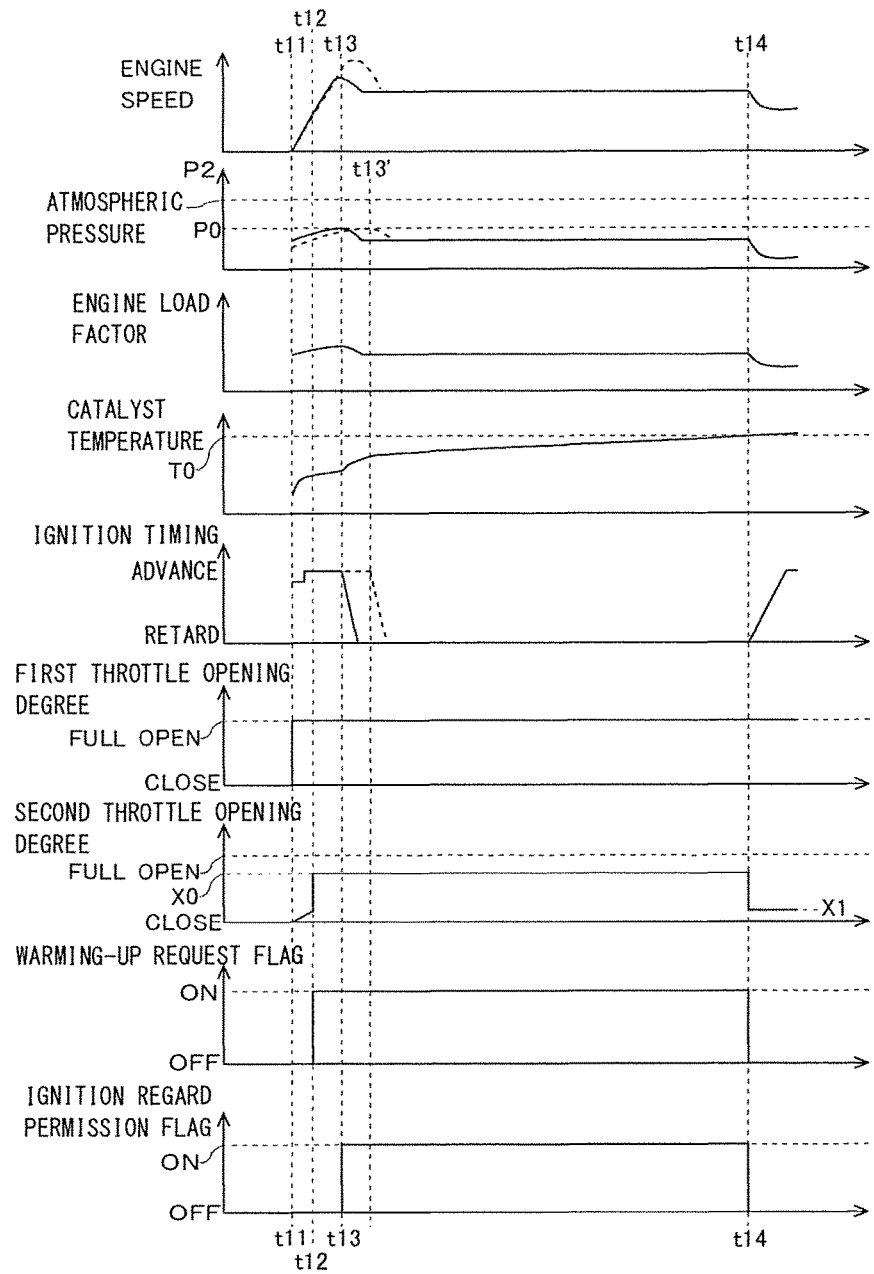

CONTROL APPARATUS FOR NATURALLY ASPIRATED GASOLINE ENGINE

CROSS-REFERENCE TO RELATED APPLICATIONS

This application claims the benefit of Japanese Patent Application No. 2016-101640, filed May 20, 2016, which is incorporated by reference herein in its entirety.

BACKGROUND

Technical Field

The present disclosure relates to a control apparatus for a naturally aspirated gasoline engine.

Description of the Related Art

Naturally aspirated gasoline engines control the quantity of fresh air supplied into a cylinder by controlling the degree of opening of a throttle provided in the intake passage. To improve fuel economy and to reduce harmful emissions, some naturally aspirated gasoline engines are provided with an EGR apparatus, which recirculates a portion of the exhaust gas back to the intake. Patent Literature 1 discloses a configuration of an air intake system comprising a junction of the exhaust gas recirculated by the EGR apparatus (or the EGR gas) with the intake located downstream of the throttle. In this configuration, the exhaust gas is recirculated by the EGR apparatus under the influence of a negative pressure created in the intake passage due to closing-down of the throttle.

CITATION LIST

Patent Literature

Patent Literature 1: Japanese Patent Application Laid-Open No. 2015-175357

SUMMARY

When the site at which the EGR gas recirculated by the EGR apparatus flows into the intake passage of a naturally aspirated gasoline engine is located downstream of the throttle, the throttle controls the quantity of fresh air supplied into the cylinder, and the throttle affects the quantity of the EGR gas introduced into the intake passage by the EGR apparatus. When the gasoline engine is in a low load operation state, it is necessary to make the degree of opening of the throttle small to reduce the quantity of fresh air supplied into the cylinder. This leads to an increase in the negative pressure created in the intake passage into which the EGR gas is recirculated. If the negative pressure in the intake passage becomes high at the time when the EGR gas is recirculated into it, a circumstance that facilitates the recirculation of the exhaust gas from the exhaust passage to the intake passage is established, making it difficult to control the quantity of the recirculated EGR gas accurately.

When the required load of the naturally aspirated gasoline engine is high, it is necessary to supply into the cylinder a large quantity of fresh air corresponding to the required load. It is known to utilize the intake pulsation effect for this purpose. For efficient utilization of the intake pulsation effect, it is necessary that the volume of the space in the intake passage downstream of the throttle be relatively large.

Moreover, when the EGR gas is recirculated by the EGR apparatus, it is necessary that a relatively large quantity of fresh air and EGR gas be mixed appropriately.

As above, when EGR gas is recirculated by the EGR apparatus in a naturally aspirated gasoline engine, it is preferred that the quantity of fresh air and the quantity of EGR gas be controlled in good balance according to the required load of the gasoline engine. However, researches on intake systems taking account of the balance in supply of fresh air and EGR gas over a relatively large load range from low loads to high loads have not been made yet in prior arts. The present disclosure has been made in view of the above-described circumstances, and an object of the present disclosure is to supply fresh air and EGR gas into a cylinder in good balance according to the required load in a naturally aspirated gasoline engine.

Solution to Problem

To solve the above problem, according to the present disclosure, two throttles are provided in an intake passage of a naturally aspirated gasoline engine, and the site of confluence of EGR gas recirculated by an EGR apparatus with the intake passage is located downstream of the upstream throttle. Moreover, the degree of opening of the throttles and the degree of opening of an EGR valve of the EGR apparatus are controlled according to the required load of the gasoline engine, thereby enabling appropriate supply of fresh air and EGR gas according to the required load.

More specifically, according to the present disclosure there is provided a control apparatus for a naturally aspirated gasoline engine including a first throttle provided in an intake passage of a gasoline engine, a surge tank comprising a specific capacity provided downstream of said first throttle, a second throttle provided in the intake passage downstream of said surge tank, and an EGR apparatus including an EGR passage used to recirculate a portion of exhaust gas discharged from said gasoline engine back to said intake passage between said first throttle and said second throttle and an EGR valve provided in said EGR passage. The control apparatus comprises a controller comprising at least one processor. The controller may be configured to:

control the quantity of fresh air supplied to said gasoline engine by adjusting the degree of opening of said second throttle while keeping said first throttle fully open and to adjust the degree of opening of said EGR valve so as to achieve an EGR rate adapted to the operation state of said gasoline engine when the operation state of said gasoline engine falls in a low load range;

control the quantity of fresh air supplied to said gasoline engine by adjusting the degree of opening of said first throttle and the degree of opening of said second throttle while keeping the EGR valve fully open and to control the quantity of EGR gas so as to achieve an EGR rate adapted to the operation state of said gasoline engine when the operation state of said gasoline engine falls in a middle load range higher in load than said low load range; and control the quantity of fresh air supplied to said gasoline engine by adjusting the degree of opening of said first throttle while keeping said second throttle fully open and to adjust the degree of opening of said EGR valve so as to achieve an EGR rate adapted to the operation state of said gasoline engine when the operation state of said gasoline engine falls in a high load range higher in load than said middle load range.

The naturally aspired gasoline engine to which the control apparatus according to the present disclosure is applied has the first throttle and the second throttle arranged in order from upstream in the intake passage and the surge tank comprising a specific capacity is disposed between these throttles. The capacity of the surge tank is determined taking account of desired intake pulsation effect in the intake passage and other conditions. The EGR passage in which EGR gas flows joins with the intake passage at a location between the first throttle and the second throttle. Thus, after EGR gas reaches the intake passage, it is supplied into the cylinder through at least the second throttle.

In the above-described naturally aspirated gasoline engine, an EGR rate adapted to the operation state of the gasoline engine is to be achieved in order to improve fuel economy and reduce harmful emissions. The EGR rate is defined as the proportion of the quantity of EGR gas to the quantity of intake air, which is the sum of the quantity of EGR gas and the quantity of fresh air. To achieve the aforementioned EGR gas rate, it is necessary to adjust the quantity of EGR gas recirculated to the intake passage through the EGR passage. In connection with this, it should be noted that in naturally aspirate gasoline engines, a required operation state cannot be achieved unless an appropriate quantity of fresh air adapted to the required operation state is supplied into the cylinder.

Hence, the control apparatus for the naturally aspirated gasoline engine may be configured to adjust the EGR gas quantity (or the EGR rate) and the fresh air quantity required according to the operation state of the naturally aspirated gasoline engine by the controller that performs the above-described control according to the operation state. Specifically, when the operation state of the naturally aspirated gasoline engine falls in a low load range (this circumstance will be expressed as "in the low load range"), the quantity of fresh air supplied to the naturally aspirated gasoline engine may be controlled by adjusting the degree of opening of the downstream second throttle while keeping the upstream first throttle fully open. In this mode, the volume of the space between the second throttle and the cylinder is relatively small, because the space downstream of the second throttle, of which the degree of opening is adjusted, does not include the surge tank. Hence, fresh air can be supplied into the cylinder quickly during acceleration, thereby enabling an improvement in the response in acceleration.

We will discuss the control of EGR gas with the above-describe throttle control. Since the first throttle is kept fully open, the negative pressure at the junction of the EGR passage and the intake passage downstream of the first throttle is relatively low. Consequently, the difference in the pressure between the spaces upstream (or the exhaust passage side) and downstream (or the intake passage side) of the EGR valve provided in the EGR passage is low, enabling accurate control of the EGR gas quantity by adjusting the degree of opening of the EGR valve. In the low load range, since the required EGR rate is relatively low, a quantity of EGR gas large enough to achieve the required EGR rate can be supplied without difficulties, even if the differential pressure across the EGR valve is small due to the fully-opened first throttle. As above, in the low load range, the quantity of fresh air supplied to the naturally aspirated gasoline engine may be controlled substantially by the second throttle, and the quantity of EGR gas may be controlled substantially by the EGR valve.

When the operation state of the naturally aspirated gasoline engine falls in a middle load range (this circumstance will be expressed as "in the middle load range"), the quantity of fresh air to be supplied into the cylinder is larger and the required EGR rate is higher than in the low load range. Then, in order to recirculate a larger quantity of EGR gas than in the low load range back to the intake passage, the degree of opening of the first throttle is adjusted to a degree of opening smaller than the fully open state while keeping the EGR valve fully open. Consequently, the negative pressure in the space downstream of the first throttle becomes high, and it is possible to recirculate a relatively large quantity of EGR gas to the intake passage by adjusting the degree of opening of the first throttle.

Moreover, to achieve the operation state falling in the middle load range, the quantity of fresh air supplied to the cylinder may be controlled by adjusting the degree of opening of the second throttle as well as the first throttle. The degree of opening of the first throttle is adjusted in order to achieve the aforementioned EGR rate. However, the degree of opening of the first throttle actually exerts an influence on the quantity of fresh air supplied into the cylinder through the adjustment of the degree of opening of the second throttle. Hence, in the middle load range, the quantity of fresh air and the quantity of EGR gas supplied to the naturally aspirated gasoline engine may be controlled substantially by the first throttle and the second throttle.

When the operation state of the naturally aspirated gasoline engine falls in a high load range (this circumstance will be expressed as "in the high load range"), the quantity of fresh air supplied to the naturally aspirated gasoline engine may be controlled by adjusting the degree of opening of the upstream first throttle while keeping the downstream second throttle fully open. In this mode, since the space downstream of the first throttle, of which the degree of opening is adjusted, includes the surge tank, the volume of the space between the first throttle and the cylinder is relatively large. Hence, the intake pulsation effect can be utilized effectively, and an improved volumetric efficiency enables supply of a quantity of fresh air adapted to the load into the cylinder.

We will discuss the control of EGR gas with the above-describe throttle control. Since the degree of opening of the first throttle is adjusted in order to control the fresh air quantity as described above, a negative pressure is created at the junction of the EGR passage and the intake passage, which is located downstream of the first throttle, facilitating recirculation of EGR gas back to the intake passage through the EGR passage. To achieve the required EGR rate, the EGR gas quantity is controlled by adjusting the degree of opening of the EGR valve. As above, in the high load range, the quantity of fresh air supplied to the naturally aspirated gasoline engine may be controlled substantially by the first throttle, and the EGR gas quantity may be controlled substantially by the EGR valve.

With the control apparatus for a naturally aspirated gasoline engine according to the present disclosure as described above, fresh air and EGR gas can be supplied into the cylinder in good balance according to the required load over a relatively wide load range from the low load range to the high load range. In the above-described configuration of the air intake system of the naturally aspirated gasoline engine, arranging the surge tank downstream of the junction of the EGR passage and the intake passage enables fresh air and EGR gas to be supplied in good balance as described above and enables the EGR gas recirculated to the intake passage to be mixed sufficiently with fresh air while it flows to the cylinder.

The controller included in the above-described control apparatus for a naturally aspirated gasoline engine may be further configured to:

perform warming-up process for an exhaust gas purification catalyst provided in an exhaust passage of said gasoline engine by retarding the timing of ignition by the ignition plug when the temperature of said exhaust gas purification catalyst during idle running in cold start-up of said gasoline engine is equal to or lower than a predetermined temperature; and control the quantity of fresh air supplied to said gasoline engine by adjusting the degree of opening of said second throttle while keeping said first throttle fully open when the warming-up process for said exhaust gas purification catalyst is performed, even if the operation state of said gasoline engine falls in said middle load range.

In the naturally aspirated gasoline engine comprising the controller configured to perform the warming-up process, the warming-up process is performed to warm up the exhaust gas purification catalyst if the temperature of the exhaust gas purification catalyst during idle running in engine start-up is equal to or lower than the predetermined temperature below which the exhaust gas purification catalyst cannot exercise its exhaust gas purifying capability satisfactorily. In the warming-up process, the timing of ignition by the ignition plug is retarded from that in the case where the warming-up process is not performed. This delays the time of combustion of gasoline fuel, thereby raising the temperature of the exhaust gas for warming-up of the exhaust gas purification catalyst.

During the warming-up process, the required load of the naturally aspirated gasoline engine is increased in some cases in order to raise the exhaust gas. Hence, when the warming-up process is performed during cold start-up, the operation state of the naturally aspirated gasoline engine may sometimes fall in the middle load range. Then, if the control by the controller that performs the above-described control in the middle load range is performed in accordance with the operation state during such warming-up process, the quantity of fresh air supplied to the naturally aspirated gasoline engine will be controlled by adjusting the degree of opening of the first throttle and the degree of opening of the second throttle in the above-described manner. Then, while it is necessary for the pressure in the intake passage downstream of the first throttle to rise to some extent to enable adequate supply of fresh air to the naturally aspirated gasoline engine during cold star-up, the engine speed rises relatively before the pressure in the intake passage rises high because the first throttle is arranged upstream of the surge tank. For that reason, an excessive rise in the engine speed is likely to occur.

As described above, since the first throttle is arranged upstream of the surge tank, when the first throttle is opened to supply fresh air into the cylinder for warming-up, the delay time taken for the quantity of fresh air in the cylinder to increase is long due to a relatively large volume of the space in the intake passage between the first throttle and the cylinder. Such a long delay time necessitates a delay of the time to start the retard of the ignition timing for warming-up process, making it difficult to carry out the warming-up process quickly.

To solve the above-described problem encountered with the warming-up process during cold start-up, even when the operation state of the naturally aspirated gasoline engine falls in the middle load range during the warming-up process, the controller may be configured to control the quantity of fresh air supplied to the gasoline engine by adjusting the degree of opening of the second throttle while keeping the first throttle fully open. Then, the volume of the space in the intake passage downstream of the closed-down throttle can be made relatively small during the warming-up process. In consequence, the above-described excessive rise in the engine speed can be prevented, and the warming-up process can be carried out quickly. After the warming-up of the exhaust gas purification catalyst is finished, the quantity of fresh air and the quantity of EGR gas may be controlled by the controller that performs the above-described control in the low load range, the middle load range, and the high load range in accordance with the operation state of the naturally aspirated gasoline engine.

The present disclosure enables well-balanced supply of fresh air and EGR gas into a cylinder according to the required load in a naturally aspirated gasoline engine.

BRIEF DESCRIPTION OF DRAWINGS

FIG. 1 is a diagram showing the general configuration of a naturally aspirated gasoline engine to which a control apparatus according to the present disclosure is applied.

FIG. 2 shows the load ranges including a low load range, a middle load range, and a high load range, as load ranges in which the operation state of the gasoline engine falls and an EGR operation range in which supply of EGR gas is performed.

FIG. 3 is a first flow chart of an intake air supply process performed by a control apparatus according to the present disclosure.

FIG. 4 is a diagram showing operation states of the naturally aspirated gasoline engine shown in FIG. 1 at times t1 to t7 in a case where the operation state shifts from the low load range to the high load range.

FIG. 5 is a diagram showing the changes with time of parameters relating to the naturally aspirated gasoline engine including the engine load factor and the engine speed etc. with the shift of the operation state shown in FIG. 4.

FIG. 6 is a second flow chart of an intake air supply process performed by the control apparatus according to the present disclosure.

FIG. 7 is a diagram showing the changes with time of parameters relating to the naturally aspirated gasoline engine including the engine load factor and the engine speed etc. in a case where the intake air supply process shown in FIG. 6 is performed.

DESCRIPTION OF EMBODIMENTS

In the following, specific embodiments of the present disclosure will be described with reference to the drawings. The dimensions, materials, shapes, relative arrangements, and other features of the components that will be described in connection with the embodiments are not intended to limit the technical scope of the present disclosure only to them, unless particularly stated.

Embodiment 1

FIG. 1 is a diagram showing the general configuration of a naturally aspirated gasoline engine 1 (which will be simply referred to as "gasoline engine 1" hereinafter) to which a control apparatus according to a first embodiment is applied. The gasoline engine 1 is an in-cylinder injection spark-ignition internal combustion engine for driving a vehicle. The intake system of the gasoline engine 1 is configured to enable natural aspiration. Specifically, in an intake passage 10 leading to the cylinder of the gasoline engine 1, there are provided a first throttle 3, a surge tank 4, and a second throttle 5, which are arranged downstream of an air cleaner 2 in order along the direction of intake air flow. The surge tank 4 has an intake space of a specific capacity to enable effective utilization of the intake pulsation effect in supplying intake air into the cylinder. The second throttle 5 is arranged just upstream of the intake manifold 12 of the gasoline engine 1.

In the exhaust system of the gasoline engine 1, a three-way catalyst 6 serving as an exhaust gas purification catalyst is provided in an exhaust passage 11 connected to the cylinder of the gasoline engine 1. Moreover, the system includes an EGR passage 13, one end of which is connected to the exhaust passage 11 downstream of the three-way catalyst 6. The other end of the EGR passage 13 is connected to the intake passage 10 at the junction 14 located between the first throttle 3 and the surge tank 4. The EGR passage 13 recirculates a portion of the exhaust gas flowing in the exhaust passage 11 back to the intake passage 10 as EGR gas. The EGR passage 13 is provided with an EGR cooler 7 for cooling the EGR gas and an EGR valve 8 for controlling the flow rate of the recirculated EGR gas, which are arranged in order along the direction of the recirculated EGR gas flow. The EGR passage 13, the EGR cooler 7, and the EGR valve 8 constitute the EGR apparatus according to the present disclosure. While in the case illustrated in FIG. 1 the EGR passage 13 is connected to the exhaust passage 11 at a location downstream of the three-way catalyst 6, the EGR passage 13 may be connected to the exhaust passage 11 at a location upstream of the three-way catalyst 6, alternatively.

The gasoline engine 1 is provided with an ECU 20, which is an electronic control unit that performs various controls of the gasoline engine 1. In the gasoline engine 1, the ECU 20 is electrically connected with an accelerator opening degree sensor 21. Thus, the ECU 20 receives a signal representing the accelerator opening degree and calculates the required engine load and engine load factor of the gasoline engine 1 etc. The ECU 20 is also electrically connected with a crank position sensor 22. Thus, the ECU 20 receives a signal representing the rotational angle of the output shaft of the gasoline engine 1 and calculates the engine speed of the gasoline engine 1 etc. Moreover, the ECU 20 is electrically connected with an air flow meter 23 provided in the intake passage 10 and capable of sensing the flow rate of fresh air flowing in the intake passage 10. The ECU 20 is also electrically connected with other various sensors provided in the gasoline engine 1 along with the above-mentioned sensors. The ECU 20 controls the quantity and timing of fuel injection through a fuel injection valve (not shown) and the timing of ignition by an ignition plug (not shown), the degree of opening of the first throttle 3, the degree of opening of the second throttle 5, and the degree of opening of the EGR valve 8 in the gasoline engine 1. The ECU 20 performs various controls in the gasoline engine 1.

In the gasoline engine 1, fresh air and EGR gas are supplied into the cylinder according to the operation state of the gasoline engine 1. Supply of fresh air and EGR gas will be described with reference to FIG. 2. In the description in this specification, the operation state of the internal combustion engine 1 is specified by its engine load factor and the engine speed. FIG. 2 shows the load range in which the operation state of the gasoline engine 1 falls, which is divided into a low load range R1, a middle load range R2, and a high load range R3. The low load range R1 is the lowest load range among all the load ranges, the high load range R3 is the highest load range among all the load ranges, and the middle load range R2 is the range situated between the low load range R1 and the high load range R3. Hence, when the operation state of the gasoline engine 1 changes from low loads to high loads as shown in FIG. 4 referred to later, the load range in which the operation state falls shifts from the low load range R1 to the high load range R3 via the middle load range R2. As a general rule, the quantity of fresh air to be supplied into the cylinder increases with increasing engine load factor of the gasoline engine 1.

In the gasoline engine 1, recirculation of EGR gas back to the intake passage 10 is performed by the EGR apparatus according to the operation state of the gasoline engine 1 in order to improve fuel economy and reduce harmful emissions. In FIG. 2, an EGR operation range R5 in which recirculation of EGR gas by the EGR apparatus is performed is also shown in addition to the aforementioned load ranges. Specifically, the EGR operation range R5 extends in the low load range R1, the middle load range R2, and the high load range R3, but it will be seen from FIG. 2 that the EGR operation range R5 does not extend to the lower load region of the low load range R1 or the higher load region of the high load range R3. The quantity of EGR gas to be supplied in the EGR operation range R5 is set to a quantity needed to achieve an EGR rate required according to the operation state of the gasoline engine 1. The EGR rate mentioned above is the proportion of the EGR gas quantity to the intake air quantity. This EGR rate will be hereinafter referred to as the "required EGR rate".

As above, in the gasoline engine 1, it is required that the quantities of fresh air and EGR gas to be supplied into the cylinder be controlled appropriately according to the operation state of the gasoline engine 1. If appropriate quantities of fresh air and EGR gas are not supplied, it is difficult to achieve the required operation state and to achieve the required EGR rate. In this embodiment, supply of fresh air and EGR gas according to the operation state of the gasoline engine 1 is carried out as follows.

<In the Low Load Range>

In the low load range, namely when the operation state of the gasoline engine 1 falls in the low load range R1, the upstream first throttle 3 in the intake passage 10 is kept fully open, and the degree of opening of the downstream second throttle 5 is adjusted to an opening degree by which a quantity of fresh air adequate to achieve the required operation state is supplied into the cylinder. Hence, a negative pressure created in the space in the intake passage 10 downstream of the first throttle 3 and upstream of the second throttle 5, which includes the surge tank 4, is relatively low, and a relatively high negative pressure is actually created in the intake manifold 12 downstream of the second throttle 5. The surge tank 4 is not arranged in the space downstream of the second throttle 5, of which the degree of opening is controlled by the above-described throttle opening degree control according to the required operation state. Hence, the volume of the space between the second throttle 5 and the cylinder is relatively small, enabling quick filling of the cylinder with fresh air during acceleration, and thereby enabling an improvement in the response in acceleration.

We will discuss the control of EGR gas with the above-describe throttle control. The negative pressure at the junction 14 of the EGR passage 13 and the intake passage 10 is relatively low because the first throttle 3 is opened fully as described above. Consequently, the difference in the pressure between the spaces upstream and downstream of the EGR valve 8 provided in the EGR passage 13 (which will be hereinafter referred to as the "differential pressure across the EGR valve 8") is low, enabling accurate control of the EGR gas quantity by adjusting the degree of opening of the EGR valve 8. In the low load range, since the required EGR rate is relatively low, the required EGR rate can be achieved even if the flow rate of EGR gas in the EGR passage 13 is low due to a relatively low differential pressure across the EGR valve 8. As above, in the low load range, the quantity of fresh air supplied to the gasoline engine 1 is controlled substantially by the second throttle 5, and the quantity of EGR gas is controlled substantially by the EGR valve 8.

<In the Middle Load Range>

In the middle load range, namely when the operation state of the gasoline engine 1 falls in the middle load range R2, the quantity of fresh air to be supplied into the cylinder is larger and the required EGR rate is higher than those in the low load range. Hence, to recirculate a larger quantity of EGR gas back to the intake passage 10 than in the low load range, the EGR valve 8 is kept fully open and the degree of opening of the first throttle 3 is adjusted, namely set to a degree of opening smaller than the fully opened state. In consequence, the negative pressure in the space downstream of the first throttle 3 becomes high, making the differential pressure across the EGR valve 8 high. Thus, a relatively large quantity of EGR gas can be recirculated back to the intake passage 10 by adjusting the degree of opening of the first throttle 3.

Furthermore, to meet the requirement of the operation state falling in the middle load range R2, the quantity of fresh air supplied into the cylinder is controlled by adjusting the degree of opening of the second throttle 5 as well as the first throttle 3. More specifically, since the degree of opening of the first throttle 3 is adjusted so as to supply a quantity of EGR gas needed to achieve the required EGR rate as described above, the quantity of fresh air actually supplied into the cylinder is controlled by adjusting the degree of opening of the second throttle 5 taking account of the closed-down opening of the first throttle 3. As above, the degree of opening of the first throttle 3 may be considered to exert an influence on the quantity of fresh air actually supplied into the cylinder through the adjustment of the degree of opening of the second throttle 5. Thus, in the middle load range, the quantity of fresh air supplied to the gasoline engine 1 is controlled substantially by the first throttle 3 and the second throttle 5, and the EGR gas quantity is substantially controlled by the first throttle 3.

<In the High Load Range>

In the high load range, namely when the operation state of the gasoline engine 1 falls in the high load range R3, the second throttle 5 is kept fully open, and the degree of opening of the first throttle 3 is adjusted to an opening degree by which a quantity of fresh air adequate to achieve the required operation state is supplied into the cylinder. Then, since the space downstream of the first throttle 3, of which the degree of opening is adjusted according to the operation state, includes the surge tank 4, the volume of the space between the first throttle 3 and the cylinder is relatively large. Hence, the intake pulsation effect can be utilized effectively, and an improved volumetric efficiency enables appropriate supply of fresh air into the cylinder according to the operation state in the high load range.

We will discuss the control of EGR gas with the above-describe throttle control. Since the degree of opening of the first throttle 3 is adjusted in order to control the fresh air quantity, a negative pressure is created at the junction 14 of the EGR passage 13 and the intake passage 10, which is located downstream of the first throttle 3, facilitating recirculation of EGR gas back to the intake passage 10. To achieve the required EGR rate, the EGR gas quantity is controlled by adjusting the degree of opening of the EGR valve 8. As above, in the high load range, the quantity of fresh air supplied to the gasoline engine 1 is controlled substantially by the first throttle 3, and the EGR gas quantity is controlled substantially by the EGR valve 8.

Now, a specific sequence of the intake air supply process for supplying fresh air and EGR gas into the cylinder according to the operation state of the gasoline engine 1 will be described with reference to FIG. 3. This intake air supply process is carried out by execution of a certain control program by the ECU 20. Firstly in step S101, the operation state of the gasoline engine 1 is determined. As described above, the operation state is specified by parameters including the engine load factor and the engine speed. Then, in step S102, an EGR rate required to be achieved in the gasoline engine 1 (or required EGR rate) is determined on the basis of the operation state determined in step S101. The correlation between the required EGR rate and the operation state is obtained in advance to achieve desired fuel economy and emissions with the gasoline engine 1 and prepared as a control map stored in the memory of the ECU 20. The required EGR rate is determined by accessing this control map using the operation state determined in step S101 as arguments. After the completion of the processing of step S102, the process proceeds to step S103.

In step S103, it is determined whether or not the operation state determined in step S101 falls in the low load range R1. If an affirmative determination is made in step S103, the process proceeds to step S104. If a negative determination is made in step S103, the process proceeds to step S105. In step S105, it is determined whether or not the operation state determined in step S101 falls in the middle load range R2. If an affirmative determination is made in step S105, the process proceeds to step S106. If a negative determination is made in step S105, the process proceeds to step S107. Thus, if the operation state of the gasoline engine 1 falls in the low load range R1, the process proceeds to step S104, if the operation state of the gasoline engine 1 falls in the middle load range R2, the process proceeds to step S106, and if the operation state of the gasoline engine 1 falls in the high load range R3, the process proceeds to step S107.

In step S104, supply of fresh air and EGR gas for the low load range is performed. Specifically, as described above, the first throttle 3 is kept fully open, and the degree of opening of the second throttle 5 is adjusted to an opening degree by which a quantity of fresh air adequate to achieve the required operation state is supplied into the cylinder. Moreover, the degree of opening of the EGR valve 8 is adjusted so as to achieve the required EGR rate determined as above. Thereby, an improvement in the response in acceleration and an improvement in the accuracy in controlling the EGR rate can be achieved. The processing of step S104 executed by the ECU 20 corresponds to the processing by the controller that performs the control in the low load range according to the present disclosure. When it is not necessary to supply EGR gas into the cylinder while the operation state falls in the low load range, namely when the required EGR rate is zero, the EGR valve 8 is fully closed. After the completion of the processing of step S104, the intake air supply process is terminated.

In step S106, supply of fresh air and EGR gas for the middle load range is performed. Specifically, as described above, the EGR valve 8 is kept fully open, and the degree of opening of the first throttle 3 is adjusted so as to achieve the required EGR rate determined as above. Moreover, to meet the requirement of the operation state falling in the middle load range R2, the quantity of fresh air supplied into the cylinder is controlled by adjusting the degree of opening of the second throttle 5 taking account of the degree of opening of the first throttle 3. Thus, a larger quantity of fresh air than in the low load range and EGR gas can be supplied in good balance into the cylinder. The processing of step S106 executed by the ECU 20 corresponds to the processing by the controller that performs the control in the middle load range according to the present disclosure. When it is not necessary to supply EGR gas into the cylinder while the operation state falls in the middle load range, namely when the required EGR rate is zero, the EGR valve 8 is fully closed. After the completion of the processing of step S106, the intake air supply process is terminated.

In step S107, supply of fresh air and EGR gas for the high load range is performed. Specifically, as described above, the second throttle 5 is kept fully open, and the degree of opening of the first throttle 3 is adjusted to an opening degree by which a quantity of fresh air adequate to achieve the required operation state is supplied into the cylinder. Moreover, the degree of opening of the EGR valve 8 is adjusted so as to achieve the required EGR rate determined as above. Thereby, fresh air and EGR gas can be supplied effectively utilizing the intake pulsation effect. The processing of step S107 executed by the ECU 20 corresponds to the processing by the controller that performs the control in the high load range according to the present disclosure. When it is not necessary to supply EGR gas into the cylinder while the operation state falls in the high load range, namely when the required EGR rate is zero, the EGR valve 8 is fully closed. After the completion of the processing of step S107, the intake air supply process is terminated.

FIG. 5 shows the changes with time of parameters relating to the gasoline engine 1 with the intake air supply process shown in FIG. 3 in a case where the operation state of the gasoline engine 1 changes from the low load range R1 to the high load range R3 over a period from time t1 to time t7 as shown in FIG. 4. Times t1 to t7 in FIG. 4 are defined as follows.

t1: the starting point, at which the operation state falls in the low load range R1, t2: time at which the operation state enters the EGR operation range R5 while falling in the low load range R1, t3: time at which the operation state shifts from the low load range R1 to the middle load range R2 while falling in the EGR operation range R5, t4: time at which the operation state falls in the middle load range R2 while falling in the EGR operation range R5 also, t5: time at which the operation state shifts from the middle load range R2 to the high load range R3 while falling in the EGR operation range R5, t6: time at which the operation state leaves the EGR operation range R5 while falling in the high load range R3 and, t7: the end point at which the operation state falls in the high load range R3.

The parameters relating to the gasoline engine 1 of which the changes with time are shown in FIG. 5 are, in order from above, the engine load factor, the engine speed, the degree of opening of the first throttle 3, the degree of opening of the second throttle 5, the required EGR rate, the degree of opening of the EGR valve 8, the pressure P1 at the junction 14 of the EGR passage and the intake passage 10 (which will be hereinafter referred to as the "junction pressure"), and the pressure P2 in the intake manifold 12 (which will be hereinafter referred to as the "intake manifold pressure").

In the low load range (between time t1 and time t3), the EGR valve 8 is opened to recirculate EGR gas from time t2 onward. As described above, in the low load range, since the first throttle 3 is kept fully open, the negative junction pressure P1 is relatively low. Therefore, the quantity of recirculated EGR gas can be controlled accurately by adjustment of the degree of opening of the EGR valve 8. In particular, even if the degree of opening of the EGR valve is changed largely at time t2 at which the EGR valve 8 starts to open, recirculation of EGR gas to the intake passage 10 is not apt to overshoot. Therefore, recirculation of EGR gas can be started at lower loads, allowing the EGR operation range R5 to be extended to lower loads. In the low load range, the degree of opening of the throttle 2 is increased in response to increases in the engine load factor of the gasoline engine 1, so that a quantity of fresh air needed to achieve the required operation state is supplied into the cylinder. During the period between time t2 and time t3, the degree of opening of the EGR valve 8 is gradually increased according to the required EGR rate and reaches the fully open state at time t3.

In the middle load range (between time t3 and time t5), the EGR valve 8 is kept fully open. Moreover, the degree of opening of the first throttle 3 is decreased from time t3 onward to increase the recirculation of EGR gas to achieve the required EGR rate. As the degree of opening of the first throttle 3 is adjusted in this way, the junction pressure P1 decreases. In other words, the negative pressure at the junction 14 increases. Time t4 is the time at which the required EGR rate becomes maximum, and the required EGR rate has the maximum value throughout the period between time t4 and time t5. The degree of opening of the first throttle 3 is adjusted according to this change in the required EGR rate. Furthermore, the degree of opening of the second throttle 5 is adjusted taking account of the degree of opening of the first throttle 3 thus changed so as to supply to the cylinder a quantity of fresh air needed to achieve the required operation state. Then, at time t5, the degree of opening of the second throttle 5 reaches the fully open state.

In the high load range (between time t5 and time t7), the EGR valve 8 is fully closed to stop recirculation of EGR gas from time t6 onward. As described above, in the high load range, the second throttle 5 is kept fully open. The degree of opening of the first throttle 3 is adjusted so as to supply to the cylinder a quantity of fresh air needed to achieve the required operation state. Consequently, the negative junction pressure P1 decreases with the increase in the engine load factor from time t5 onward. Since the second throttle 5 is kept fully open in the high load range, the junction pressure P1 and the intake manifold pressure P2 are substantially equal.

As above, the control apparatus according to the present disclosure enables well balanced supply of fresh air and EGR gas over a relatively large load range in the naturally aspirated gasoline engine 1. In the above-described intake air supply process, the required EGR rate is determined on the basis of the operation state of the naturally aspirated gasoline engine 1, and the processing of steps S104, S106, and S107 is executed according to the required EGR rate thus determined. Alternatively, the processing of steps S104, S106, and S107 may be executed on the basis of the operation state of the naturally aspirated gasoline engine 1 so as to achieve the EGR rate adapted to the operation state, without executing the processing of determining the EGR rate. In this case, a control map specifying the relationship between the operation state of the naturally aspirated gasoline engine and the degrees of opening of the first throttle 3, the second throttle 5, and the EGR valve 8 may be prepared taking account of the EGR rate to be achieved in the naturally aspirated gasoline engine 1 and stored in the ECU 20, and the processing of steps S104, S106, and S107 may be executed by accessing this control map. The junction 14 of the EGR passage 13 and the intake passage 10 may be located downstream of the surge tank 4.

Embodiment 2

A second embodiment of the process of supplying intake air into the cylinder according to the operation state of the gasoline engine 1 will be described with reference to FIGS. 6 and 7. FIG. 6 is a flow chart of the intake air supply process according to the second embodiment. This intake air supply process is carried out repeatedly by execution of a certain control program by the ECU 20 while the gasoline engine 1 is running. FIG. 7 shows the changes with time of parameters relating to the gasoline engine 1 with the intake air supply process shown in FIG. 6. The parameters shown in FIG. 7 are, in order from above, the engine speed, the intake manifold pressure, the engine load factor, the catalyst temperature, the ignition timing, the degree of opening of the first throttle 3, the degree of opening of the second throttle 5, a warming-up request flag, and an ignition retard permission flag.

The intake air supply process according to this embodiment relates to catalyst warming-up control that is performed in order to raise the temperature of the three-way catalyst 6 when the gasoline engine 1 is started. If the catalyst temperature of the three-way catalyst 6 is not raised sufficiently to an active temperature, the three-way catalyst 6 cannot exercise its exhaust gas purifying capability effectively. In particular, in the case of cold start-up of the gasoline engine 1, the catalyst temperature of the three-way catalyst 6 is substantially equal to normal ambient temperature, and hence it is necessary to raise the catalyst temperature of the three-way catalyst 6 quickly in order to appropriately control emissions downstream of the catalyst. For this reason, a catalyst warming-up process is performed by the ECU 20 in the gasoline engine 1.

The catalyst warming-up process is a process of raising the temperature of the exhaust gas flowing into the three-way catalyst 6 and adjusting the air-fuel ratio of the exhaust gas flowing into the three-way catalyst 6 to a slightly rich air-fuel ratio (e.g. about 14.3), to thereby activate the exhaust gas purifying capability of the three-way catalyst 6 (i.e. capability of removing unburned HC derived from fuel by oxidation and removing NOx by reduction). To this end, during the catalyst warming-up process, the time of ignition by the ignition plug in the gasoline engine 1 is retarded from that during the time in which the catalyst warming-up process is not being performed, namely during the time in which the three-way catalyst 6 has already been warmed up and become active. For instance, while the time of ignition is set to a time immediately before the compression top dead center (0° ATDC) when the three-way catalyst 6 is active, it is retarded to approximately 20° ATDC during the catalyst warming-up process. By this retard of the ignition time, the combustion timing of the gasoline engine is retarded, leading to a rise in the temperature of the exhaust gas discharged to the exhaust passage 11 from the cylinder.

In the intake air supply process shown in FIG. 6, the execution of the catalyst warming-up process is controlled on the basis of a warming-up request flag which is set to ON when the temperature of the three-way catalyst 6 is lower than a predetermined temperature T0 and the three-way catalyst 6 cannot exercise its exhaust gas purifying capability and an ignition retard permission flag which is set to ON when the intake manifold pressure P2 allows the retard of the ignition timing by the ignition plug. Before the start-up of the gasoline engine 1, the warming-up request flag and the ignition retard permission flag are set to OFF. In the following, the intake air supply process will be described. Firstly in step S201, it is determined whether or not idle running in start-up of the gasoline engine 1 is continuing. This determination is made because the catalyst warming-up process is performed during idle running in cold start-up of the gasoline engine 1. If an affirmative determination is made in step S201, the process proceeds to step S202. If a negative determination is made in step S201, the process proceeds to step S212.

In this embodiment, the operation of the gasoline engine 1 is started at time t11. After the gasoline engine 1 starts to operate, the first throttle 3 is fully opened, and the degree of opening of the second throttle 5 is increased gradually (see how the degree of opening of the first throttle 3 and the degree of opening of the second throttle 5 change with time around time t11). Consequently, complete explosion occurs in the gasoline engine 1.

Then, in step S202, it is determined whether or not the temperature of the three-way catalyst 6 is lower than the predetermined temperature T0. The predetermined temperature T0 is the lowest catalyst temperature at which the three-way catalyst 6 can exercise its exhaust gas purifying capability, as described above. If the temperature of the three-way catalyst 6 is lower than the predetermined temperature T0 at the time of engine start-up, it means that the engine start-up is cold start-up and it is necessary to perform the catalyst warming-up process to raise the temperature of the three-way catalyst 6 quickly. If an affirmative determination is made in step S202, the process proceeds to step S203. If a negative determination is made in step S202, the process proceeds to step S209.

In step S203, the warming-up request flag is set to ON, and then in step S204, the degree of opening of the second throttle 5 is adjusted to a catalyst warming-up opening degree X0. The catalyst warming-up opening degree X0 is a degree of opening of the second throttle 5 that increases the quantity of fresh air supplied into the cylinder to an extent that makes the operation state of the gasoline engine 1 fall in the middle load range R2 to thereby raise the exhaust gas temperature for quick warming-up of the three-way catalyst 6. Thus, if the degree of opening of the second throttle 5 is set to the catalyst warming-up opening degree X0 and the fuel injection quantity is increased, the operation state of the gasoline engine 1 will fall in the middle load range R2 during idle running in cold start-up. As shown in FIG. 7, the processing of steps S203 and S204 is executed at time t12. After the completion of the processing of step S204, the process proceeds to step S205.

In step S205, it is determined whether the intake manifold pressure P2 in the space downstream of the second throttle 5 has reached an ignition retard reference pressure P0. The ignition regard reference pressure P0 is an intake manifold pressure corresponding to the catalyst warming-up opening degree X0 of the second throttle 5 set for warming-up of the three-way catalyst 6. When the ignition timing is retarded for catalyst warming-up, it is difficult to cause desired combustion for catalyst warming-up unless a quantity of fresh air corresponding to the catalyst warming-up opening degree X0 of the second throttle 5 is supplied into the cylinder. For this reason, a determination is made in step S205 as to whether or not the intake manifold pressure has reached the ignition retard reference pressure P0 as a condition about supply of fresh air that allows the retard of the ignition timing for the catalyst warming-up process. If an affirmative determination is made in step S205, the process proceeds to step S206. If a negative determination is made in step S205, the process proceeds to step S208. In step S206, the ignition retard permission plug is set to ON. On the other hand, in step S208, the ignition retard permission flag is set to OFF. As shown in FIG. 7, the affirmative determination in step S205 and the processing of step S206 are performed at time t13.

After the completion of the processing of step S206, the process proceeds to step S207. In step S207, retard of the ignition timing is performed, because the warming-up request flag is set to ON in step S203 and the ignition retard permission flag is set to ON in step S206. Adjusting the degree of opening of the second throttle 5 to the catalyst warming-up opening degree X0 and performing retard of the ignition timing corresponds to the warming-up process by the controller configured to perform the warming-up process according to the present disclosure. In the process of retarding the ignition timing, if the ignition timing is retarded abruptly to target ignition timing, combustion can become unstable. Hence, the ignition timing is retarded to the target ignition timing gradually with the lapse of time from time t13 at which the ignition retard permission flag is set to ON.

Now, the case where a negative determination is made in step S202 and the process proceeds to step S209 will be described. When a negative determination is made in step S202, the temperature of the three-way catalyst 6 is so high that it is not necessary to perform the catalyst warming-up process. Then, in step S209, the warming-up request flag is set to OFF, and the ignition retard permission flag is also set to OFF (at time t14 in FIG. 7). Then, in step S210, the degree of opening of the second throttle 5 is adjusted to an idle opening degree X1 corresponding to idle running performed in the case where the catalyst warming-up process is not performed. The idle opening degree X1 is an opening degree smaller (i.e. more closed) than the aforementioned catalyst warming-up opening degree X0, and the quantity of fresh air supplied into the cylinder is smaller than that in the case where the catalyst warming-up process is performed and so small that the operation state of the gasoline engine 1 falls in the low load range R1. As the degree of opening of the second throttle 5 is adjusted to the idle opening degree, the retard of the ignition timing is ceased. When the retard is ceased, the ignition timing is returned to the ignition timing without retard gradually with the lapse of time from time t14 at which the ignition retard permission flag is set to OFF, in order to prevent instability in combustion from occurring.

After the processing of step S210, the processing of steps S101 to S107 in the intake air supply process shown in FIG. 3 is performed, namely the process of supplying fresh air and EGR gas according to the operation state of the gasoline engine 1 is carried out in step S211.

Next, we will discuss the case where a negative determination is made in step S201 and the process proceeds to step S212. When a negative determination is made in step S201, idle running in engine start-up is prevented. In this case, in step S212, the warming-up request flag is set to OFF, and the ignition retard permission flag is set to OFF. Then, in step S213, the processing of steps S101 to S107 in the intake air supply process shown in FIG. 3 is performed, namely the process of supplying fresh air and EGR gas according to the operation state of the gasoline engine 1 is carried out.

In the intake air supply process shown in FIG. 6, the operation state of the gasoline engine 1 falls in the middle load range R2 in order to warm up the three-way catalyst 6 during idle running in cold start-up of the gasoline engine 1. Then, if the intake air supply process shown in FIG. 3 were applied to the catalyst warming-up process, the intake air supply for the middle load range would be performed. However, in the intake air supply process according to this embodiment shown in FIG. 6, the degree of opening of the first throttle 3 is set to full open, and the quantity of fresh air supplied into the cylinder is controlled substantially by adjusting degree of opening of the second throttle 5. This adjustment of the degree of opening of the first throttle 3 and the second throttle 5 corresponds to the process carried out by the controller configured to perform the catalyst warming-up control according to the present disclosure.

As the quantity of fresh air supplied into the cylinder is controlled by adjusting the degree of opening of the second throttle 5 while keeping the first throttle fully open, the volume of the space in the intake passage 10 downstream of the second throttle 5 is smaller than the volume of the space in the intake passage 10 downstream of the first throttle 3, of which the degree of opening is controlled when the operation state falls in the middle load range. Hence, the intake manifold pressure, which is at an atmospheric pressure at the time of cold start-up can reach a pressure corresponding to the adjusted degree of opening of the throttle quickly. Thus, it is possible to prevent an excessive rise in the engine speed of the gasoline engine 1 during cold start-up. In the graph of the engine speed in FIG. 7, the change with time of the engine speed in a case where the degree of opening of the first throttle 3 is adjusted in cold start-up of the engine is shown by the broken line.

Since the volume of the space in the intake passage 10 downstream of the second throttle 5 is relatively small as described above, the time taken for the intake manifold pressure P2 to reach the ignition retard reference pressure P0 from the time at which the degree of opening of the second throttle 5 is set to the catalyst warming-up opening degree X0 for warming-up of the three-way catalyst 6 can be shortened. This enables quick warming-up of the three-way catalyst 5 to contribute to reduction of harmful emissions. In the graphs of the intake manifold pressure and the ignition timing in FIG. 7, the change with time of the intake manifold pressure P2 and the change with time of the ignition timing with the catalyst warming-up control in a case where the degree of opening of the first throttle 3 is adjusted in engine start-up are shown by broken lines. In this case, the intake manifold pressure P2 reaches the ignition retard reference pressure P0 at time t13'. In this case also, since the volume of the space in the intake passage 10 downstream of the second throttle 5 is relatively small, even if an acceleration request is made during the catalyst warming-up process (then, a negative determination is made in step S201) a quantity of fresh air adequate to achieve the required acceleration can be supplied into the cylinder quickly by adjusting the degree of opening of the second throttle 5. In other words, good response to acceleration request can be ensured during the catalyst warming-up process.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:

1. A control apparatus for a naturally aspirated gasoline engine including a first throttle provided in an intake passage of a gasoline engine, a surge tank comprising a specific capacity provided downstream of said first throttle, a second throttle provided in the intake passage downstream of said surge tank, and an EGR apparatus including an EGR passage used to recirculate a portion of exhaust gas discharged from said gasoline engine back to said intake passage between said first throttle and said second throttle and an EGR valve provided in said EGR passage, the control apparatus comprising:

a controller comprising at least one processor configured to:

control the quantity of fresh air supplied to said gasoline engine by adjusting the degree of opening of said second throttle while keeping said first throttle fully open and to adjust the degree of opening of said EGR valve so as to achieve an EGR rate adapted to the operation state of said gasoline engine when the operation state of said gasoline engine falls in a low load range;

control the quantity of fresh air supplied to said gasoline engine by adjusting the degree of opening of said first throttle and the degree of opening of said second throttle while keeping the EGR valve fully open and to control the quantity of EGR gas so as to achieve an EGR rate adapted to the operation state of said gasoline engine when the operation state of said gasoline engine falls in a middle load range higher in load than said low load range; and control the quantity of fresh air supplied to said gasoline engine by adjusting the degree of opening of said first throttle while keeping said second throttle fully open and to adjust the degree of opening of said EGR valve so as to achieve an EGR rate adapted to the operation state of said gasoline engine when the operation state of said gasoline engine falls in a high load range higher in load than said middle load range.

2. A control apparatus for a naturally aspirated gasoline engine according to claim 1, wherein the controller is further configured to:

perform warming-up process for an exhaust gas purification catalyst provided in an exhaust passage of said gasoline engine by retarding the timing of ignition by the ignition plug when the temperature of said exhaust gas purification catalyst during idle running in cold start-up of said gasoline engine is equal to or lower than a predetermined temperature; and control the quantity of fresh air supplied to said gasoline engine by adjusting the degree of opening of said second throttle while keeping said first throttle fully open when the warming-up process for said exhaust gas purification catalyst is performed, even if the operation state of said gasoline engine falls in said middle load range.

* * * * *